United States Patent
Tsai et al.

(10) Patent No.: US 11,287,903 B2
(45) Date of Patent: Mar. 29, 2022

(54) USER INTERACTION METHOD BASED ON STYLUS, SYSTEM FOR CLASSIFYING TAP EVENTS ON STYLUS, AND STYLUS PRODUCT

(71) Applicant: Silicon Integrated Systems Corp., Hsinchu (TW)

(72) Inventors: Tsung-Hua Tsai, Hsinchu (TW); Ying-Jyh Yeh, Hsinchu (TW)

(73) Assignee: Silicon Integrated Systems Corp., Hsinchu (TW)

( * ) Notice: Subject to any disclaimer, the term of this patent is extended or adjusted under 35 U.S.C. 154(b) by 668 days.

(21) Appl. No.: 16/262,291

(22) Filed: Jan. 30, 2019

(65) Prior Publication Data
US 2019/0235642 A1   Aug. 1, 2019

(30) Foreign Application Priority Data

Feb. 1, 2018 (TW) ................................ 107103689

(51) Int. Cl.
| | |
|---|---|
| *G06F 3/0346* | (2013.01) |
| *G06F 3/041* | (2006.01) |
| *G06F 3/0354* | (2013.01) |
| *G05B 13/00* | (2006.01) |
| *G06N 3/02* | (2006.01) |

(52) U.S. Cl.
CPC ........ *G06F 3/0346* (2013.01); *G06F 3/03545* (2013.01); *G06F 3/0416* (2013.01); *G05B 13/00* (2013.01); *G06N 3/02* (2013.01)

(58) Field of Classification Search
None
See application file for complete search history.

(56) References Cited

U.S. PATENT DOCUMENTS

| | | | |
|---|---|---|---|
| 9,336,374 B2 | 5/2016 | Liang et al. | |
| 2011/0304573 A1 | 12/2011 | Smith | |
| 2015/0035759 A1* | 2/2015 | Harrison | ................. G06F 3/043 |
| | | | 345/173 |
| 2018/0188938 A1* | 7/2018 | Deselaers | ................ G06N 3/02 |

FOREIGN PATENT DOCUMENTS

| | | |
|---|---|---|
| CN | 101872259 A | 10/2010 |
| CN | 102135823 A | 7/2011 |
| CN | 105677039 A | 6/2016 |
| TW | 512550 B | 12/2015 |
| TW | 2016001011 A | 1/2016 |

* cited by examiner

*Primary Examiner* — Stephen T. Reed
(74) *Attorney, Agent, or Firm* — Muncy, Geissler, Olds & Lowe, P.C.

(57) ABSTRACT

A novel method is proposed to operate a stylus product. In this method, inertial measurement unit (IMU) signals are used to estimate a tilted angle of the stylus product. On the other hand, acceleration signals measured when a finger taps a stylus are collected to train a deep neural network as a tap classifier. A combination of the tilted angle and the tap classifier allows a user to interact with a peripheral device (e.g. a touchscreen) by rotating and taping the stylus product. A tap classifying system and a stylus product are also provided.

11 Claims, 5 Drawing Sheets

USER INTERACTION METHOD BASED ON STYLUS, SYSTEM FOR CLASSIFYING TAP EVENTS ON STYLUS, AND STYLUS PRODUCT

BACKGROUND

1. Field of Disclosure

The present disclosure relates to human-computer interaction technologies, and more particularly to a user interaction method based on a stylus, a system for classifying tap events on a stylus, and a stylus product.

2. Description of Related Art

As an indicating means, styluses usually cooperate with touch screens to achieve a selection function for objects displayed on the screens. With improvement of screen resolution and development of the styluses, the styluses are also taken as a handwriting tool frequently or are used as a brush. In another aspect, graphic tabs or digitizers of various degrees also need to cooperate with the styluses. However, the function of the styluses is currently not powerful. Accordingly, developing a new generation of the styluses to enrich their function and enhance product competitiveness has become an important issue in this field.

SUMMARY

The objective of the present invention is to provide a user interaction method based on a stylus, a system for classifying tap events on a stylus, and a stylus product, for providing a novel way of interaction.

To achieve above objective, an aspect of the present invention provides a user interaction method based on a stylus, comprising: utilizing a sensor to detect various tap events generated by taps on the stylus to obtain a plurality of acceleration signals; sampling each of the acceleration signals to obtain a plurality of feature values for each of the acceleration signals; taking the feature values of one of the acceleration signals and a classification label recorded based on a type of the tap events corresponding to the one acceleration signal as a sample and generating a sample set comprising a plurality of samples; taking the feature values of one of the samples as an input and a freely-selected weighting parameter group as adjusting parameters and inputting them into a deep neural network to obtain a predicted classification label; adjusting the weighting parameter group by way of a backpropagation algorithm based on an error lying between the predicted classification label and an actual classification label of the sample; and taking out the samples of the sample set in batches to train the deep neural network and fine tune the weighting parameter group to determine an optimized weighting parameter group.

Another aspect of the present invention provides a system for classifying tap events on a stylus, comprising: the stylus, having a sensor disposed in the stylus and configured to detect various tap events generated by taps on the stylus to obtain a plurality of acceleration signals; and a computer device, coupled to the stylus, the computer device comprising: a processor, configured to receive the acceleration signals transmitted from the sensor; and a memory, connected to the processor, the memory comprising a plurality of program instructions executable by the processor, the processor executing the program instructions to perform a method comprising: sampling each of the acceleration signals to obtain a plurality of feature values for each of the acceleration signals; taking the feature values of one of the acceleration signals and a classification label recorded based on a type of the tap events corresponding to the one acceleration signal as a sample and generating a sample set comprising a plurality of samples; taking the feature values of one sample as an input and a freely-selected weighting parameter group as an adjusting parameter and inputting them into a deep neural network to obtain a predicted classification label; adjusting the weighting parameter group by way of a backpropagation algorithm based on an error lying between the predicted classification label and an actual classification label of the sample; and taking out the samples of the sample set in batches to train the deep neural network and fine tune the weighting parameter group to determine an optimized weighting parameter group.

Still another aspect of the present invention provides a stylus product, comprising: a sensor, configured to detect a tap operation performed to the stylus product to generate acceleration signals and calculate a tilted angle of the stylus product by way of a fusion algorithm; a controller, coupled to the sensor, wherein a deep neural network corresponding to the deep neural network according to claim 1 is deployed in the controller, and the controller is configured to serve the corresponding deep neural network and the optimized weighting parameter group obtained according to claim 1 as a tap classifier and input the acceleration signals transmitted from the sensor into the tap classifier to obtain a predicted tap type; and a wireless transmission module, coupled to the controller, configured to transmit wireless signals carrying the predicted tap type and the calculated tilted angle.

The present disclosure deploys the sensor, its corresponding fusion algorithm, and the tap classifier in the stylus product so as to provide a novel way of operations. In some embodiments, a great amount of convenient interaction can be implemented between the user and the stylus product by rotating and tapping the stylus product without a need to directly or indirectly contact a touch screen.

DETAILED DESCRIPTION OF PREFERRED EMBODIMENTS

To make the objectives, technical schemes, and technical effects of the present disclosure more clearly and definitely, the present disclosure will be described in details below by using embodiments in conjunction with the appending drawings. It should be understood that the specific embodiments described herein are merely for explaining the present disclosure, and as used herein, the term "embodiment" refers to an instance, an example, or an illustration but is not intended to limit the present disclosure. In addition, the articles "a" and "an" as used in the specification and the appended claims should generally be construed to mean "one or more" unless specified otherwise or clear from the context to be directed to a singular form.

Figure 1:
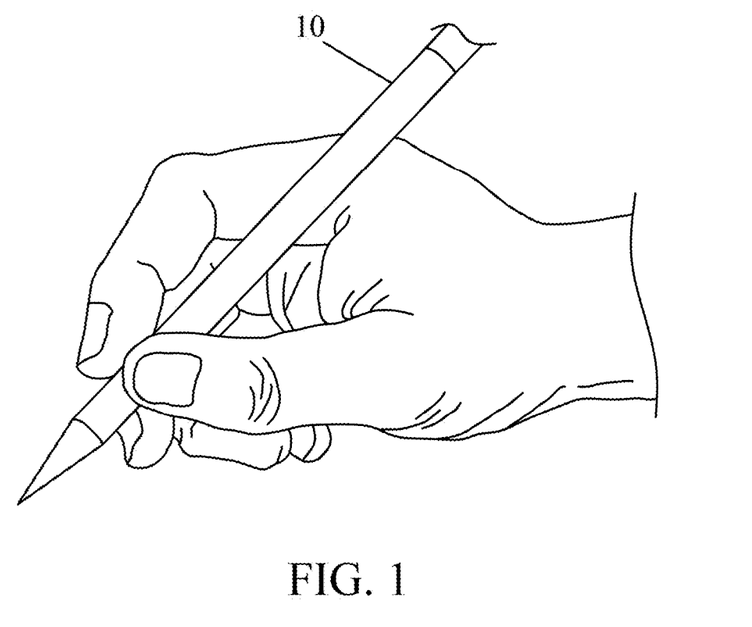
FIG. 1 is a schematic diagram showing a stylus held by a user.

FIG. 1 is a schematic diagram showing a stylus held by a user. The hand of a user can interact with a stylus 10, for example, changing a tilted angle of the stylus 10 and tapping the stylus 10 by a finger of the user. The objective of the present disclosure is to provide a novel interaction method, allowing the user to rotate and tap the stylus 10, thereby interacting with a peripheral device such as a touch screen.

In the present disclosure, sensor fusion techniques are utilized in combination with a tap classifier obtained through deep learning, allowing the user to perform various operations by way of changing the tilted angle of the stylus 10 and tapping the stylus 10. In the sensor fusion techniques, a 6-axis or 9-axis inertial measurement unit (IMU) may be used to calculate the tilted angle of the stylus 10 by way of a fusion algorithm (e.g., Madgwick's algorithm and Kalman filter). In addition, the tap classifier is obtained by classifying and learning tap events generated when the user taps the stylus 10. The use of the tap classifier can classify types of taps made by the user and performed to the stylus 10.

Variety in changing the tilted angle may include at least one of rotating the stylus 10 around an X axis to change a roll angle, rotating the stylus 10 around a Y axis to change a pitch angle, and rotating the stylus around a Z axis to change a yaw angle. The direction (i.e., positive or negative direction) of rotated angle may be herein determined by the right-hand rule (referring to FIG. 7C).

The type of the tap events may, for example, depend on the type of or the number of taps, made by the user finger, on the stylus 10, for example, a one-time tap, a two-time tap, a three-time tap, and so on.

The combination of the tilted angle of the stylus and the tap classifying technique can be applied to various application scenarios, for example, rotating the stylus to change brush color or font size and then tapping the stylus by the finger to confirm or cancel the operation. This may have different configurations based on different application scenarios. A person skilled in the art can understood that the inventive concepts of the present disclosure can be used in other applications. Of course, relations between types of interaction and operations to be performed can be defined by users themselves.

Figure 2:
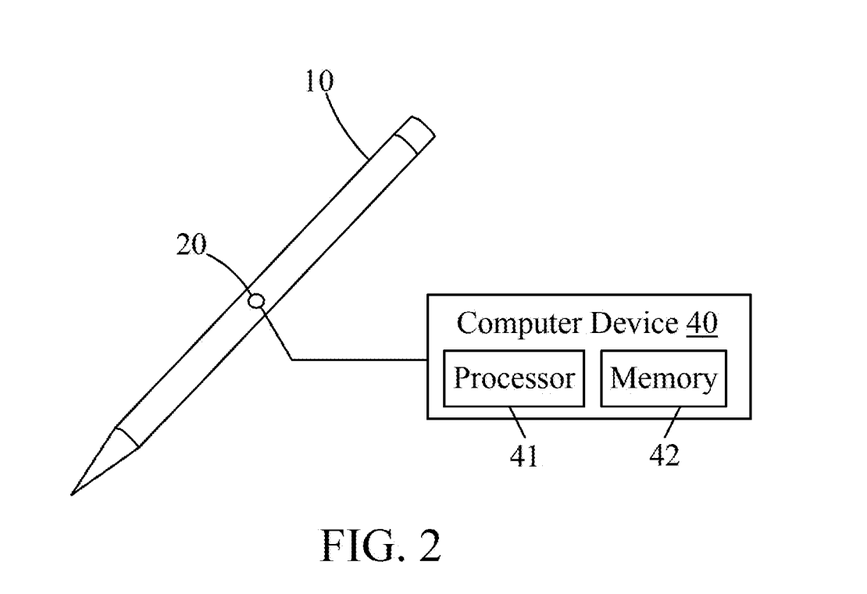
FIG. 2 is a schematic diagram illustrating a system for classifying tap events according to an embodiment of the present disclosure.

FIG. 2 is a schematic diagram illustrating a system for classifying tap events according to an embodiment of the present disclosure. The system includes a stylus 10 and a computer device 40 coupled to the stylus 10. The stylus 10 can be a capacitive stylus which can change the capacitance on a touch panel to generate touch operations. The computer device 40 can be a computer having a certain degree of computing ability, such as a personal computer, a notebook computer, and so on. In the present disclosure, in order to classify the tap events made by the user and performed to the stylus 10, it needs to collect the tap events first. In this regard, various actions performed to the stylus 10 are manually made. Signals corresponding to the tap events are transmitted to the computer device 40. The computer device 40 proceeds with learning using a deep neural network.

As shown in FIG. 2, the stylus 10 includes at least one sensor 20. The sensor 20 can be an (9-axis) IMU consisted of a 3-axis gyroscope, a 3-axis accelerometer, and a 3-axis magnetometer, for example. Depending on the application, the sensor 20 may also be a combination of a (3-axis) accelerometer and a (3-axis) gyroscope. The sensor 20 may be disposed at any position of an inner part of the stylus 10

The computer device 40 receives the acceleration signals generated by the sensor 20, via a connection port, and feeds the signals into the deep neural network for classification learning. After the tap events are manually produced, the type of each of the tap events may also be inputted to the computer device 40 for supervised learning. As shown in FIG. 2, the computer device 40 includes a processor 41 and a memory 42. The processor 41 receives the acceleration signals transmitted from the sensor 20. The memory 42 is connected to the processor 41. The memory 42 includes a plurality of program instructions executable by the processor 41. The processor 41 executes the program instructions to perform computations relating to the deep neural network. The computer device 40 may adopt GPU or TPU to perform the computations relating to the deep neural network for improving computational speed.

Figure 3:
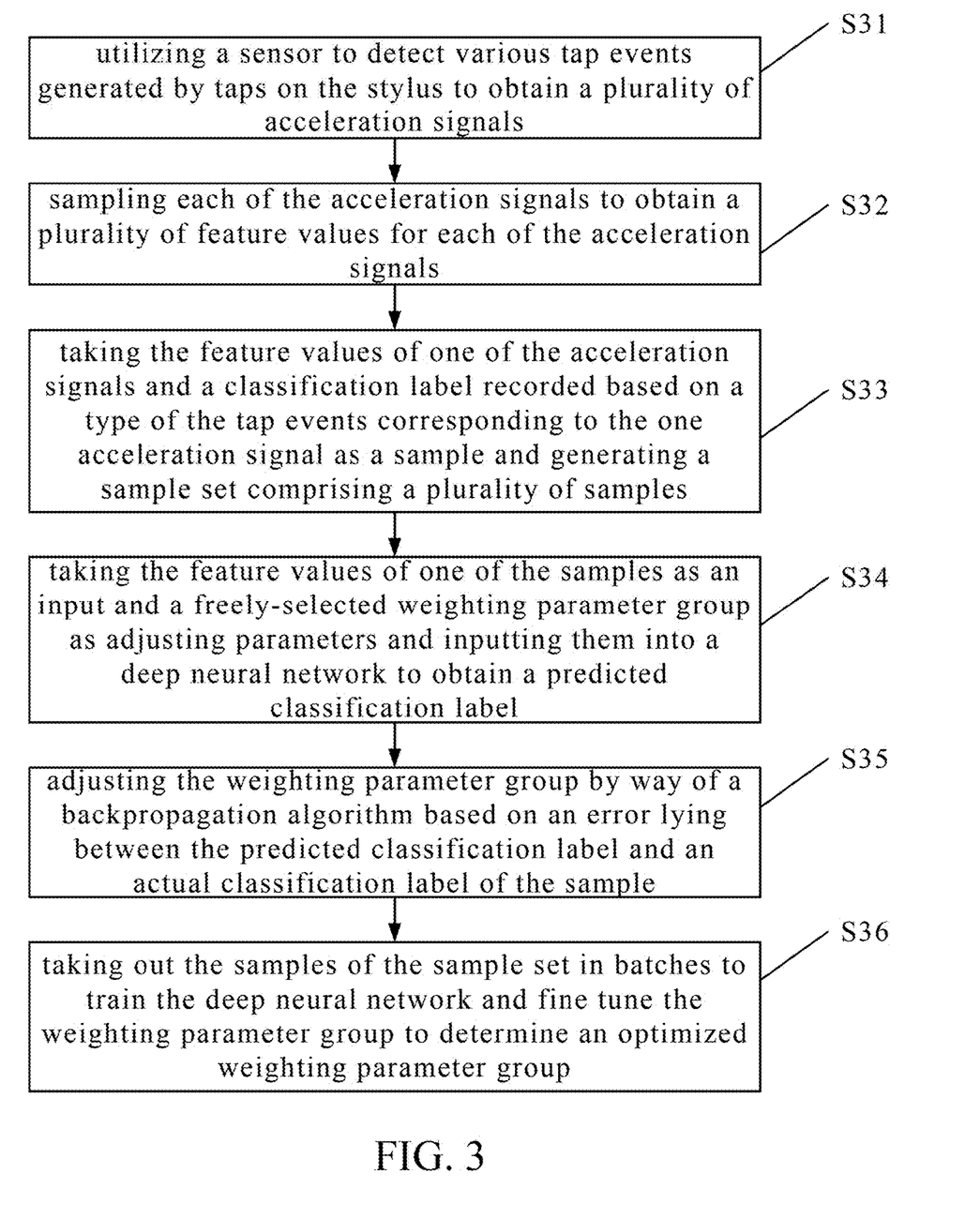
FIG. 3 is a flowchart of a user interaction method based on a stylus according to an embodiment of the present disclosure.

FIG. 3 is a flowchart of a user interaction method based on a stylus according to an embodiment of the present disclosure. Referring to FIG. 3 with reference to FIG. 2, the method includes the following Steps S31 to S36. These steps correspond to a process of training the tap classifier.

Step S31—utilizing a sensor 20 to detect various tap events generated by taps on the stylus 10 to obtain a plurality of acceleration signals. In this step, various tap events are generated by interacting manually with the stylus 10 and the sensor 20 disposed in the stylus 10 detects the tap events to generate the acceleration signals. In the present disclosure, the number of the sensors 20 are not restricted to one. A plurality of sensors may be disposed. The sensor 20 may also be disposed at any position of an inner part of the stylus 10.

In an embodiment, the sensor 20 may be implemented by a 9-axis IMU. The acceleration detected by the sensor 20 is a function of time and has three directional components which can be projected to a frequency domain using Fourier transform. Specifically, the method may further include a step of converting each of the acceleration signals from time domain to frequency domain.

After converting to the frequency domain, low-frequency DC components and high-frequency noise signals may be further filtered and removed in order to prevent classification results from being affected by the gravitational acceleration and the noise signals. Specifically, the method may further include a step of filtering each of the acceleration signals to remove portions of high frequencies and low frequencies.

In another embodiment, the sensor 20 may be implemented by a combination of a 3-axis accelerometer and a 3-axis gyroscope. The 3-axis accelerometer can be used to measure three acceleration components for the stylus 10 moving in a three-dimensional space to obtain the acceleration signals.

Step S32—sampling each of the acceleration signals to obtain a plurality of feature values for each of the acceleration signals. In this step, each of the acceleration signals generated by the sensor 20 is sampled. For example, a plurality of data points are obtained by sampling each of the acceleration signals in the frequency domain at certain frequency intervals. These data points are feature values, which serve as training data of the deep neural network after normalization.

Step S33—taking the feature values of one of the acceleration signals and a classification label recorded based on a type of the tap events corresponding to the one acceleration signal as a sample and generating a sample set comprising a plurality of samples. In this step, one acceleration signal measured by the sensor 20 and the type of a tap event corresponding to the one acceleration signal serve as a record, that is, a sample. A sample set consists of a plurality of samples. Specifically, a sample includes the feature values of one acceleration signal and a classification label corresponding to the one acceleration signal.

The sample set can be divided into a training sample set and a test sample set. The training sample set can be used to train the deep neural network. The test sample set is used to test a trained deep neural network to yield accuracy of the classification.

Step S34—taking the feature values of one sample as an input and a freely-selected weighting parameter group as adjusting parameters and inputting them into a deep neural network to obtain a predicted classification label. The feature values of one sample obtained from Step S33 is inputted to the deep neural network via an input layer. The deep neural network outputs the predicted classification label.

Figure 4:
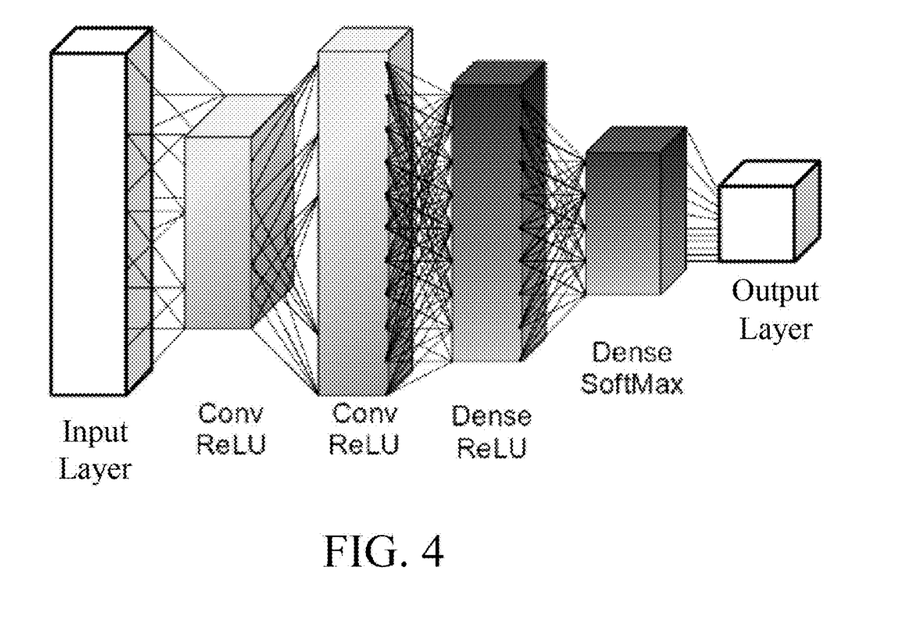
FIG. 4 is a schematic diagram illustrating a deep neural network according to an embodiment of the present disclosure.

FIG. 4 illustrates an example of deep neural network. The deep neural network generally includes the input layer, an output layer, and learning layers between the input layer and the output layer. Each sample of the sample set is inputted from the input layer and the predicted classification label is outputted from the output layer. Generally speaking, the deep neural network includes a plurality of learning layers. The number of the learning layers (e.g., 50-100 layers) is quite large, thereby achieving deep learning. The deep neural network shown in FIG. 4 is only an example, and the deep neural network of the present disclosure is not limited thereto.

The deep neural network may include a plurality of convolutional layers, batch normalization layers, pooling layers, fully-connected layers, and rectified linear units (ReLu), and a Softmax output layer. The present disclosure may adopt an appropriate number of layers for the learning to compromise the prediction accuracy and the computational efficiency. It is noted that a use of too many layers may decrease the accuracy. The deep neural network may include a plurality of cascaded sub networks and each of the sub networks is connected to subsequent sub networks for example, Dense Convolutional Network (DenseNet), for improving the prediction accuracy by way of feature re-usage.

Step S35—adjusting the weighting parameter group by way of a backpropagation algorithm based on an error lying between the predicted classification label and an actual classification label of the sample. Optimization of the deep neural network aims at minimizing a classification loss. A backpropagation algorithm may be adopted for the optimization. That is, a predicted result obtained from the output layer is compared to an actual value to get an error, which is propagated backward layer by layer to calibrate parameters of each layer.

Step S36—taking out the samples of the sample set in batches (mini-batches) to train the deep neural network and fine tune the weighting parameter group to determine an optimized weighting parameter group. The weighting parameter group is fine tune a little bit every time a sub sample set (a batch) is used for the training. Such a process is iterately performed until the classification loss converges. Finally, a parameter group carrying out the highest prediction accuracy for the test sample set is selected and serves as an optimized parameter group for the model.

Figure 5:
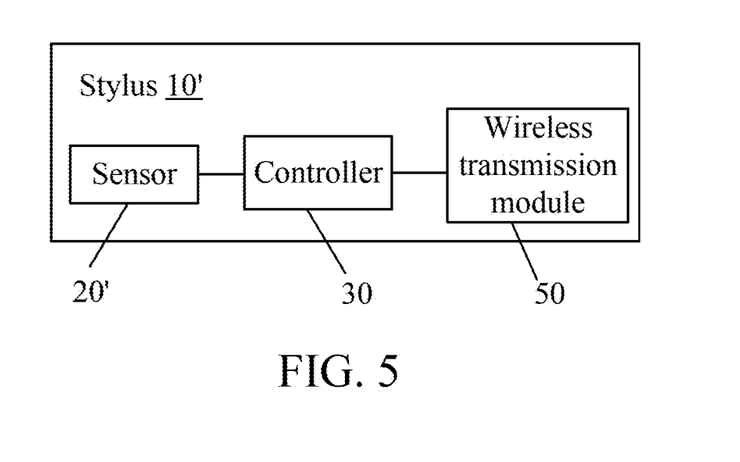
FIG. 5 is a schematic diagram illustrating a stylus product according to an embodiment of the present disclosure.

FIG. 5 is a schematic diagram illustrating a stylus product according to an embodiment of the present disclosure. As shown in FIG. 5, the stylus produce 10' includes one or more sensors 20', a controller 30, and a wireless transmission module 50. The sensor 20' may be disposed at any position of an inner part of the stylus produce 10'. In an example, the sensor 20' can be an IMU with a built-in accelerometer for three directions and a built-in 3-axis gyroscope, which can detect acceleration and angular velocity of the stylus product 10'. In another example, the sensor 20' can be a 9-axis IMU including a 3-axis accelerometer, a 3-axis gyroscope, and a 3-axis magnetometer.

In an aspect, the sensor 20' is configured to detect the acceleration signals generated by tap operations performed to the stylus product 10'. In another aspect, the sensor 20' is configured to calculate a tilted angle of the stylus product by way of a fusion algorithm (e.g., Madgwick's algorithm and Kalman filter). The controller 30 is coupled to the sensor 20'. The controller 30 receives the acceleration signals generated by the sensor 20' and the calculated tilted angle.

The controller 30 is configured to perform classification prediction for a tap event generated when a user taps the stylus product 10', to obtain a predicted tap type. For example, a deep neural network identical to or corresponding to the deep neural network adopted in Steps S34 to S36 is deployed in the controller 30, and the optimized weighting parameter group obtained from Step S36 is stored in the controller 30. The corresponding deep neural network and the optimized weighting parameter group serves as a tap classifier deploying in the stylus product 10'. The controller 30 inputs the acceleration signals transmitted from the sensor 20' into the tap classifier to obtain a classification label for a corresponding tap event. That is, the predicted tap type is obtained. In such a way, the stylus product 10' achieves classification prediction for the tap events.

Specifically, program codes corresponding to the deep neural network and the optimized weighting parameter group may be written to the firmware of the controller 30. The controller 30 executes algorithms of the deep neural network to predict the type of a tap event.

The wireless transmission module 50 is connected to or coupled to the controller 30, and is configured to receive the predicted tap type from the controller 30 and the tilted angle of the stylus product 10' from the sensor 20' and transmit wireless signals carrying the tilted angle and the predicted tap type. For example, the wireless transmission module 50 can be a Bluetooth module which can communicate with a tablet computer (or a notebook computer) to transmit such information to the tablet computer via Bluetooth signals.

Figure 6:
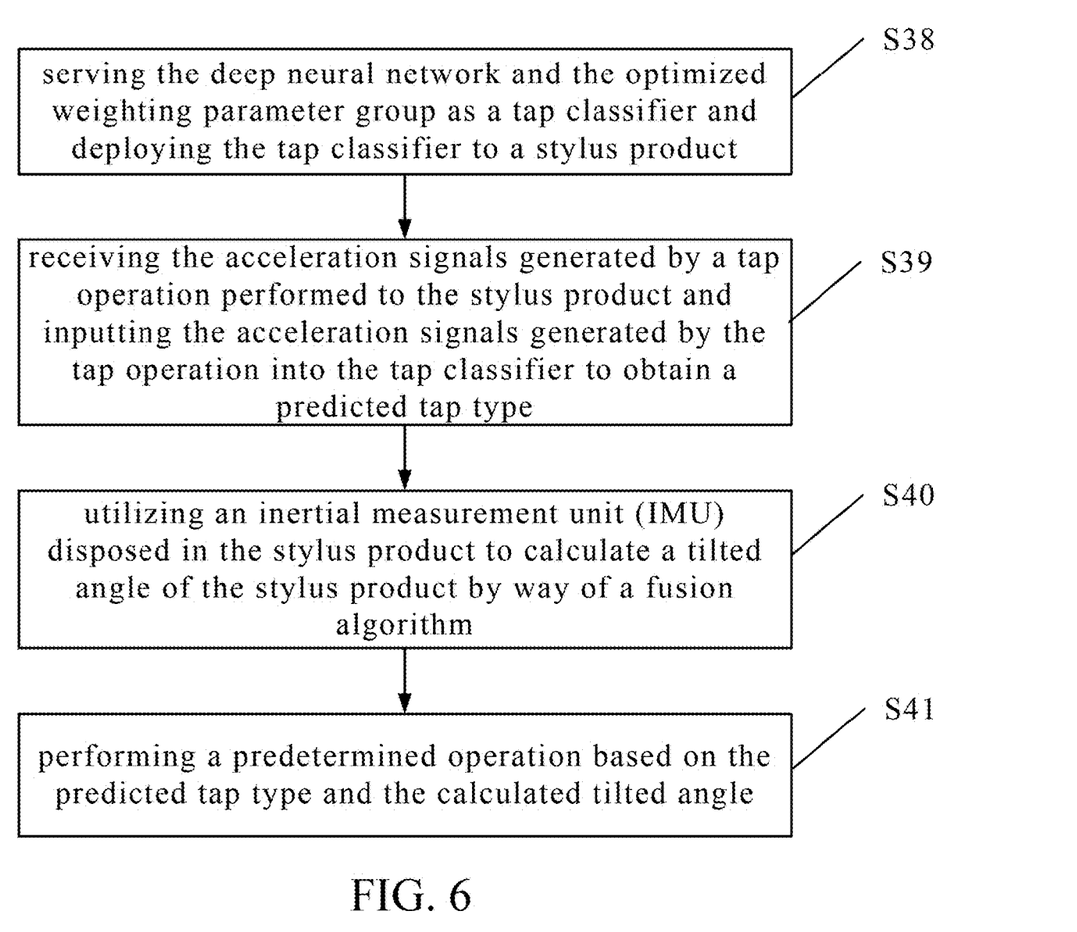
FIG. 6 is a flowchart of a user interaction method based on a stylus according to an embodiment of the present disclosure.

Referring to FIG. 6 with reference to FIG. 5, the method further includes the flowing Steps S38 to S41. These steps correspond to a process of deploying the tap classifier in the stylus product 10' to implement various applications.

Step S38—serving the deep neural network and the optimized weighting parameter group as a tap classifier and deploying the tap classifier to a stylus product 10'. In this step, the stylus product 10' has a tap classifier, which includes a deep neural network identical to or corresponding to the deep neural network adopted in Steps S34 to S36 and the optimized weighting parameter group obtained from Step S36.

Step S39—receiving the acceleration signals generated by a tap operation performed to the stylus product and inputting the acceleration signals generated by the tap operation into the tap classifier to obtain a predicted tap type. In this step, when a user interacts with the stylus product 10' to generate a tap event, the sensor 20' in the stylus product 10' measures an acceleration signal and inputs the acceleration signal into the tap classifier. The controller 30 is utilized to predict the type of the tap event.

Step S40—utilizing an IMU disposed in the stylus product 10' to calculate a tilted angle of the stylus product 10' by way of a fusion algorithm. In this step, the IMU can be a 6-axis or 9-axis IMU and can be used to calculate the tilted angle of the stylus product 10' using Madgwick's algorithm or Kalman filter.

Step S41—performing a predetermined operation based on the predicted tap type and the calculated tilted angle. In this step, the wireless transmission module 50 in the stylus product 10' transmits the predicted tap type obtained from the controller 30 and the tilted angle to, for example, a tablet computer (or a notebook computer), by use of wireless signals. The software installed on the tablet computer (or the notebook computer) can thus execute an operation corresponding to the predicted result.

In an exemplary application scenario, the user makes a one-time tapping to the stylus product for performing a confirmation operation; the user makes a two-time tapping to the stylus product for performing a cancel operation.

Figure 7A:
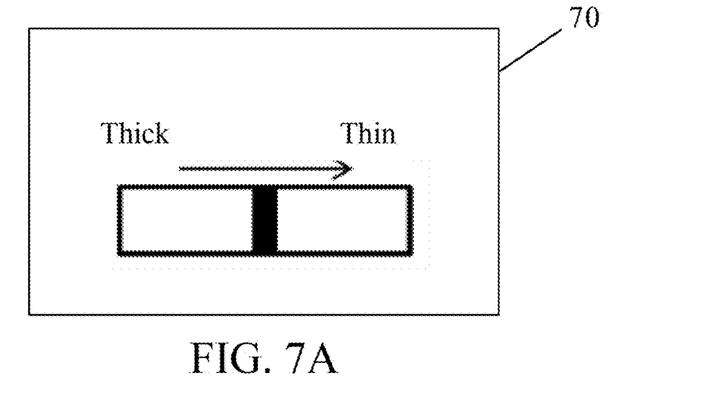
FIG. 7A is a schematic diagram showing an adjusting bar on a screen according to an embodiment of the present disclosure.

In another exemplary application scenario, after the user taps the stylus product, a screen 70 (of the tablet computer) displays an adjusting bar for indicating the thickness of tracks of the stylus product, as shown in FIG. 7A; when the user makes a further step to rotate the stylus product, the thickness of the tracks of the stylus product is changed while the process and result of the adjustment can be displayed through the adjusting bar. For example, rotating the stylus product clockwise makes the tracks thicker; rotating the stylus product counterclockwise makes the tracks thinner. Finally, the user taps the stylus product again for one or two times to confirm or cancel the changes.

Figure 7B:
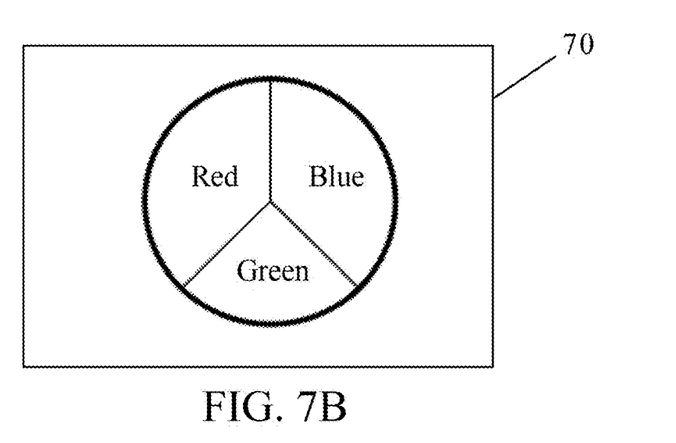
FIG. 7B is a schematic diagram showing a colorful pie chart on a screen according to an embodiment of the present disclosure.

In another exemplary application scenario, after the user taps the stylus product, the screen 70 (of the tablet computer) displays a colorful pie chart for indicating the color of tracks of the stylus product, as shown in FIG. 7B; when the user makes a further step to rotate the stylus product, an indicator is moved so as to select the color of the tracks while the process and result of the adjustment can be displayed through the colorful pie chart.

In another exemplary application scenario, after the user taps the stylus product, it is allowed to interact with the stylus product to control a scrollbar or slider of a window (e.g., a window of Microsoft Word) to browser the content through scroll up and down operations. For example, when the user rotates the stylus product around the X axis (see FIG. 7C) along a positive direction, the window is scrolled up; on the contrary, the window is scrolled down.

Figure 7C:
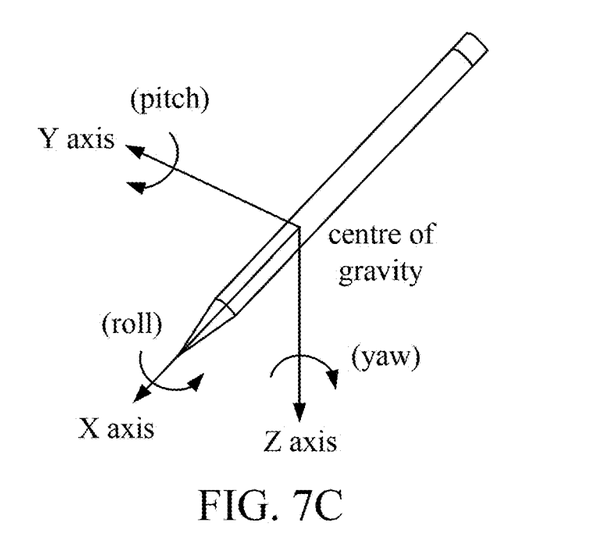
FIG. 7C is a schematic diagram illustrating a coordinate system of a stylus product according to an embodiment of the present disclosure.

In another exemplary application scenario, the user taps the stylus product to enter a control mode and a touch display device displays a corresponding menu, the user rotates the stylus product around the X axis shown in FIG. 7C (i.e., corresponding to a roll action), and the changes of a roll angle may be implemented to select the color of the tracks, adjust the brush size, select texts, or scroll the slider of the window. After that, the user may tap the stylus product again to confirm the changes or tap the stylus product for two times to cancel the operation. The afore-described adjustment can also be implemented by changing a pitch angle. Changing the pitch angle may also be corresponding to other types of operations.

The present disclosure utilizes sensor fusion techniques in combination with the tap classifier to achieve various types of interaction with the stylus product, allowing the user to perform interactive operations conveniently in many application scenarios without a need to directly or indirectly contact a touch screen.

While the preferred embodiments of the present disclosure have been illustrated and described in detail, various modifications and alterations can be made by persons skilled in this art. The embodiment of the present disclosure is therefore described in an illustrative but not restrictive sense. It is intended that the present disclosure should not be limited to the particular forms as illustrated, and that all modifications and alterations which maintain the spirit and realm of the present disclosure are within the scope as defined in the appended claims.

The invention claimed is:

1. A user interaction method based on a stylus, comprising:
    utilizing a sensor to detect various tap events generated by taps on the stylus to obtain a plurality of acceleration signals;
    sampling each of the acceleration signals to obtain a plurality of feature values for each of the acceleration signals;
    taking the feature values of one of the acceleration signals and a classification label recorded based on a type of the tap events corresponding to the one acceleration signal as a sample and generating a sample set comprising a plurality of samples;
    taking the feature values of one of the samples as an input and a freely-selected weighting parameter group as adjusting parameters and inputting them into a deep neural network to obtain a predicted classification label;
    adjusting the weighting parameter group by way of a backpropagation algorithm based on an error lying between the predicted classification label and an actual classification label of the sample; and
    taking out the samples of the sample set in batches to train the deep neural network and fine tune the weighting parameter group to determine an optimized weighting parameter group.

2. The method according to claim 1, further comprising:
    serving the deep neural network and the optimized weighting parameter group as a tap classifier and deploying the tap classifier to a stylus product; and
    receiving the acceleration signals generated by a tap operation performed to the stylus product and inputting the acceleration signals generated by the tap operation into the tap classifier to obtain a predicted tap type.

3. The method according to claim 2, further comprising:
    utilizing an inertial measurement unit (IMU) disposed in the stylus product to calculate a tilted angle of the stylus product by way of a fusion algorithm,
    wherein after the step of obtaining the predicted tap type, the method further comprises:
    performing a predetermined operation based on the predicted tap type and the calculated tilted angle.

4. The method according to claim 3, wherein the predetermined operation is selected from a group consisting of changing a brush color and changing a brush size.

5. The method according to claim 3, wherein the tilted angle is composed by at least one of a roll angle around an X axis, a pitch angle around a Y axis, and a yaw angle around a Z axis.

6. The method according to claim 1, wherein the deep neural network comprises a plurality of convolutional layers.

7. The method according to claim 1, wherein the type of the tap events comprises a type or a number of the taps on the stylus.

8. A system for classifying tap events on a stylus, comprising:
the stylus, having a sensor disposed in the stylus and configured to detect various tap events generated by taps on the stylus to obtain a plurality of acceleration signals; and
a computer device, coupled to the stylus, the computer device comprising:
a processor, configured to receive the acceleration signals transmitted from the sensor; and
a memory, connected to the processor, the memory comprising a plurality of program instructions executable by the processor, the processor executing the program instructions to perform a method comprising:
sampling each of the acceleration signals to obtain a plurality of feature values for each of the acceleration signals;
taking the feature values of one of the acceleration signals and a classification label recorded based on a type of the tap events corresponding to the one acceleration signal as a sample and generating a sample set comprising a plurality of samples;
taking the feature values of one sample as an input and a freely-selected weighting parameter group as an adjusting parameter and inputting them into a deep neural network to obtain a predicted classification label;
adjusting the weighting parameter group by way of a backpropagation algorithm based on an error lying between the predicted classification label and an actual classification label of the sample; and
taking out the samples of the sample set in batches to train the deep neural network and fine tune the weighting parameter group to determine an optimized weighting parameter group.

9. The system according to claim 8, wherein the deep neural network comprises a plurality of convolutional layers.

10. The system according to claim 8, wherein the type of the tap events comprises a type or a number of the taps on the stylus.

11. A stylus product, comprising:
a sensor, configured to detect a tap operation performed to the stylus product to generate acceleration signals and calculate a tilted angle of the stylus product by way of a fusion algorithm;
a controller, coupled to the sensor, wherein a deep neural network corresponding to the deep neural network according to claim 1 is deployed in the controller, and the controller is configured to serve the corresponding deep neural network and the optimized weighting parameter group obtained according to claim 1 as a tap classifier and input the acceleration signals transmitted from the sensor into the tap classifier to obtain a predicted tap type; and
a wireless transmission module, coupled to the controller, configured to transmit wireless signals carrying the predicted tap type and the calculated tilted angle.

* * * * *